(No Model.)
E. SCHMIDT.
COMPOUND FOR TREATING GRAPE VINES.
No. 422,544. Patented Mar. 4, 1890.
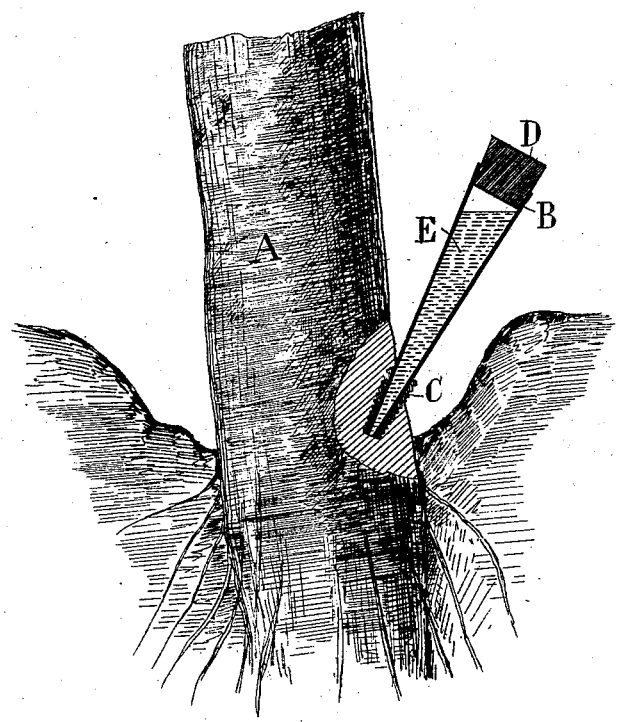
Witnesses:
Will. Norton
Alvin Belt
Inventor:
Eduard Schmidt
by John J. Halsted & Son
his Attys.

UNITED STATES PATENT OFFICE.

EDUARD SCHMIDT, OF VIENNA, AUSTRIA-HUNGARY.

COMPOUND FOR TREATING GRAPE-VINES.

SPECIFICATION forming part of Letters Patent No. 422,544, dated March 4, 1890.

Application filed March 1, 1889. Serial No. 301,616. (No specimens.) Patented in France October 18, 1888, No. 193,616.

*To all whom it may concern:*

Be it known that I, EDUARD SCHMIDT, civil engineer, a citizen of Austria-Hungary, and a resident of Vienna, in the Empire of Austria-Hungary, have invented a certain new and useful Improvement in Treating Plants for Phylloxera, of which the following is a specification, and for which I have obtained Letters Patent in France, dated October 18, 1888, No. 193,616.

My invention has for its object the destruction of the *Phylloxera vastatrix* and other parasites. All the methods used until now to attain the same effect consisted in attacking and destroying the phylloxera from outside by submersion in deadly liquids, or by the production of an unrespirable atmosphere. These processes have not given favorable results; and the present invention has for its object to produce a complete change of the nourishment or food of these insects by an alteration of the sap circulating in the vine, and thus to kill them. For that purpose I incorporate such liquids into the sap of the vines, and which, without damaging the organism of the latter, mix themselves with the sap circulating in the roots, branches, and leaves of the vine, and the said sap becomes thus mortal or deadly to the phylloxera and other parasites. I use as a preferable composition a mixture consisting of methylic alcohol, oil of hartshorn or bone-oil, turpentine, and a vegetable bitter, as colocynth or quassia, and this may be varied as below stated.

The process is performed in the following manner: In each vine infected or exposed to be infected with the phylloxera I bore as close as possible to the root one or more holes, by means of a small funnel of tin, brass, or of any other suitable material, of from .15 to .25 of an inch in depth, in such a manner that the lower opening of the funnel is in contact with the principal veins of sap beneath the bast or inner bark of the vegetable. This funnel is about three inches long, has at its larger end a diameter of about .06 of an inch, while the diameter at the outlet is about .04 of an inch. The smaller end of the funnel is provided on its outside with threads of a screw, leaving the outflow entirely open. According to the size (respectively to the age) of the vine I pour in the funnel from ten to forty grams of one of the following mixtures, viz:

Mixture No. 1, consisting of one (1) part, by weight, of methylic alcohol; about one-tenth ($\frac{1}{10}$) part, by weight, of oil of hartshorn, (bone-oil;) about one-half ($\frac{1}{2}$) part, by weight, of decoction of colocynth, (or bitter apple,) or in lieu of the latter about one-fourth ($\frac{1}{4}$) part, by weight, of green-oil, (or Gaultheria oil.)

Mixture No. 2, consisting of one part, by weight, of methylic alcohol; about one-tenth part, by weight, of oil of hartshorn, (bone-oil;) about one-eighth part, by weight, of turpentine-oil, or in place of this about one-fourth part, by weight, of turpentine-oil.

Mixture No. 3, consisting of two parts, by weight, of methylic alcohol; about one-fourth part, by weight, of extract of henbane; about one-fourth part, by weight, of turpentine-oil; about one-fourth part, by weight, of phosphoric acid of ten per cent. density.

Mixture No. 4, consisting of one part, by weight, of methylic alcohol; about one-fourth part, by weight, of turpentine-oil; about one-half part, by weight, of concentrated alcoholic tincture of bitter apple, or in place of this about one-fourth part, by weight, of turpentine-oil.

Mixture No. 5, consisting of one part, by weight, of methylic alcohol; about one-fifth part, by weight, of sulphuret of carbon; about one-fifth part, by weight, of green-oil, or in place of this about one-half part, by weight, of concentrated alcoholic tincture of colocynth, (or bitter apple.)

Mixture No. 6, consisting of one part, by weight, of methylic alcohol; one-eighth part, by weight, of extract of quassia; one-eighth part, by weight, of concentrated tincture of tannic acid.

It is very important that either of the foregoing mixtures (before being incorporated) be sufficiently liquid, uniformly mixed, and filtered in order to have the mixture rapidly absorbed in the sap of the vine and to prevent obstruction of the channels or veins conveying the sap; therefore one to one and a half part, by weight, of methylic alcohol of 60° Tralles is to be added to each of the before-said mixtures.

As soon as one of these mixtures is introduced into the funnel the larger end of it is closed up by a stopper in order to avoid evaporation. After six to ten hours the employed mixture is absorbed in the sap of the vine, the funnel is removed, the hole in the vine stopped by wax, and the funnel used for another vine.

The annexed sheet of drawing shows clearly one form of apparatus by which my process may be accomplished.

A indicates the vine. B is the funnel. C are the threads thereon. D is the stopper, and E is the mixture ready for being absorbed.

This new treatment gives the best and certain results when employed during the months of autumn, (vintage time,) because during this time the sap retrogrades to the roots and the incorporated liquid is promptly conducted to those parts of the vine where the insect (*Phylloxera vastatrix*) generally remains; but it gives, also, good results in the spring.

It is of great advantage to provide the vines submitted to this my process with a sufficiently good manure in order to strengthen the roots much injured by the attack of the phylloxera, and on the other hand to enable them to support rapidly the disturbance in their organism caused by the incorporation of the mixtures.

In case of a new attack or appearance of the phylloxera it will be advantageous to apply the mixture to the vines annually.

It is obvious that I hold myself at liberty to modify the dimensions, material, and form of the funnel and its thread of a screw as well as the proportions of the constituent parts of the hereinbefore-described mixtures.

I am aware that creosote has been inserted into the dead-wood of telegraph-poles near the ground to prevent their rotting away; but I am not aware that any composition such as I have described has ever been used to destroy parasites in living plants, nor that such or other liquid or flowing compounds or composition have been ever introduced into plants directly at or near their roots, that it may become intermixed with and ascend with the uprising sap and be diffused throughout the body and branches of the plant.

Having now described and ascertained the nature of my invention and the manner in which the same is or may be carried into effect, I declare that what I consider to be novel, and therefore claim as my invention, is—

The herein-described composition for treatment of vines affected with phylloxera by incorporation with the sap, consisting of methylic alcohol, oil of hartshorn, (known also as bone-oil,) turpentine, and a vegetable bitter, as colocynth or quassia, the compound being substantially as set forth.

Signed at Vienna, in the Empire of Austria-Hungary, this 11th day of February, A. D. 1889.

EDUARD SCHMIDT.

Witnesses:
  EDMUND JUSSEN,
  OTTO SCHIFFER.